United States Patent [19]
Landry, Jr.

[11] Patent Number: 5,475,970
[45] Date of Patent: Dec. 19, 1995

[54] AQUATIC VEGETATION SEPARATOR

[76] Inventor: Stephen Landry, Jr., 811 Mildred St., Franklin, La. 70538

[21] Appl. No.: 336,182

[22] Filed: Nov. 8, 1994

[51] Int. Cl.$^6$ .................................. A01D 44/00
[52] U.S. Cl. ........................................... 56/8
[58] Field of Search .............. 56/6–9, 249, 249.5, 56/295

[56] References Cited

U.S. PATENT DOCUMENTS

| | | | |
|---|---|---|---|
| 4,196,566 | 4/1980 | Donnelley | 56/8 |
| 4,696,149 | 9/1987 | Hawk | 56/8 |
| 5,142,849 | 9/1992 | Amimoto | 56/8 |

Primary Examiner—Michael Powell Buiz
Attorney, Agent, or Firm—Robert N. Montgomery

[57] ABSTRACT

An Aquatic vegetation cutter adaptable to the bow of small work boats having rotatable, cultivator type disks on converging angles disposed along each side of the bow, extending partially below the water line, positioned in a manner whereby forward movement of the boat tends to rotate the disks thereby cutting and parting the vegetation allowing the boat to pass unobstructed, without drawing the cut vegetation into the propulsion unit intake. A second embodiment provides a method of power driving the disks in a forward or reverse direction.

11 Claims, 7 Drawing Sheets

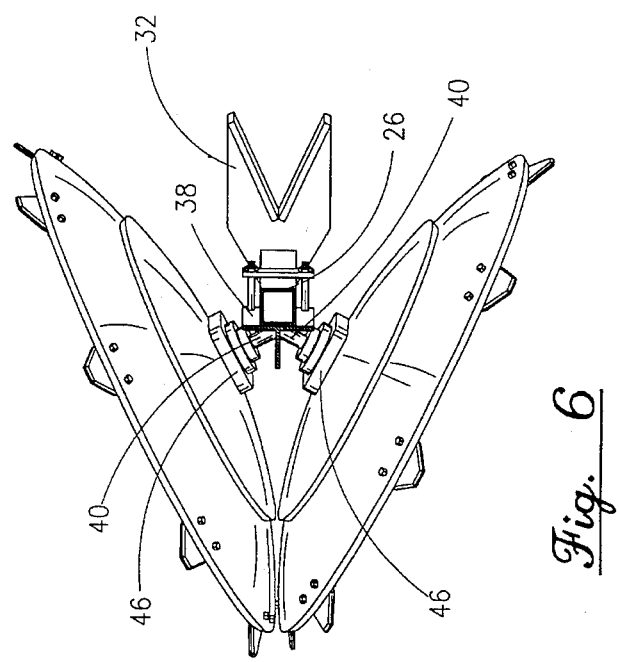
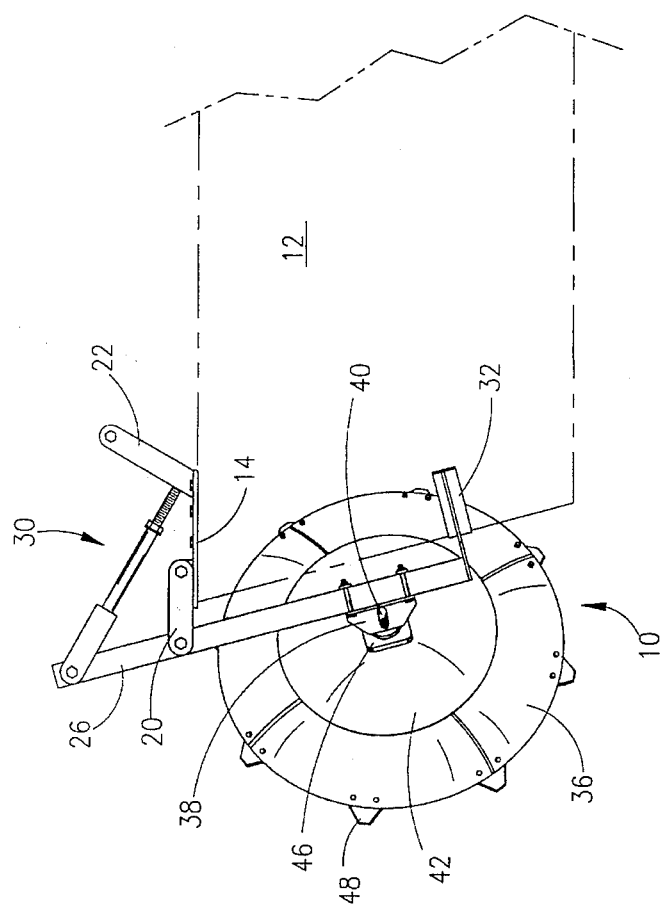

AQUATIC VEGETATION SEPARATOR

BACKGROUND OF THE INVENTION

1. Field of the Invention

The present invention relates to the surface cutting but not the harvesting of aquatic vegetation in general and more particular to the cutting and/or separation of floating vegetation to allow for boat passage.

2. General Background

Aquatic vegetation, in the form of lily pads and water grass, which clog relatively shallow, slow moving, streams and backwater marsh, presents problems for boaters in general. Such vegetation becomes even more of a problem for commercial crawfishermen, wildlife and game officials and oil & gas industry personnel who must gain access to remote wetland locations.

Aquatic vegetation is becoming more of a problem as a result of restrictions being placed on chemicals used for eradication. Such vegetation often becomes so thick that boat travel becomes impossible. Even air boats have trouble with lily pads which have a tendency to mound up under the boat.

Various aquatic vegetation cutters such as mowers and harvesters have been developed for collecting and cutting vegetation from underwater. Mowers and harvesters for surface cutting have also been tried with no avail. Weed cutters for attachment to boat motors have been developed but have proven largely ineffective with regard to floating vegetation such as lily pads. Even when such vegetation cutters are used, the loose vegetation is sucked into the intakes of the boat's motor, stalling it repeatedly.

SUMMARY OF THE PRESENT INVENTION

The present invention overcomes the problems associated with boat travel through aquatic vegetation by slicing the vegetation and parting it to each side of the boat thus preventing fouling the boat's propulsion engine. Severation is accomplished by attachment of disks similar in design to that of agricultural cultivating disks, to the bow of a boat. The disk are arranged with at least one disk parallel to each side of the boat's bow so as to intersect at a point slightly ahead of the boats bow. The mounting bracket is generally pivotal to allow for disk positioning above the water line when not in use, thus preventing drag. Adjustment is provided for setting the proper height of the disk with respect to the boat's water line and conformance to the bow configuration. The disks may also be fitted with triangular serrated cutting blades around their perimeter to provide a more positive cutting action. The cutting blades of each disk intersect thereby insuring constant rotation by both blades. The disks are free to rotate when in the lock-down, working position as a result of frictional drag by the aquatic vegetation. Such rotation causes the cutting blades to slice through even the toughest vegetation. Their large diameter, on the average of 30 inches, and their dished shape, part the chopped vegetation thus clearing a path, free of vegetation, for the boat's propulsion motor. It is anticipated that the disks may also be power driven thus adding the advantage of reverse operation in order to clear any vegetation build-up on the disk.

These disks have proven to be a distinct advantage to the boatman by providing an early warning of obstacles in the boat's path which may be covered by vegetation. The disk, upon contact with the obstacle, prevents further encounter by the boat thus allowing the boatman to seek other avenues without damage to the boat's hull. When the disks are powered, reversing the disk rotation propels the boat away from the obstacle. When the disks are powered and the boat is in, very shallow water, the disks may be used to assist in propelling the boat.

With the application of multi-disks, a boat can cut a substantial swath of vegetation at once while still maintaining a reasonable speed, thus clearing a path for other boats.

An object of the present invention is to provide an apparatus which can be adapted to most work boat hulls; whereby, the boatman can pivotally lower a set of such cultivator type disks to a prescribed depth thereby allowing the disks to rotate as a result of frictional drag upon contact with aquatic vegetation.

Another object of the present invention is to provide an apparatus which cuts the vegetation in its path and moves it to each side of a boat's hull thus allowing the boat to pass without drawing the vegetation into the boat's propulsion system.

Still another object of the present invention is to prevent banking of the aquatic plants under a boat in such a manner that a boat must attempt to ride up and over the mass thus entangling the boat's propulsion drive.

Yet another object of the present invention is to provide an aquatic vegetation separating device having two or more cultivator disks which can be power driven thus clearing a wide swath of vegetation with each pass, thereby clearing streams and canals for small craft.

BRIEF DESCRIPTION OF THE DRAWINGS

The above-mentioned features of the invention will become more clearly understood from the following detailed description when read together with the drawings in which:

FIG. 5 is a partial vertical elevation view taken along sight line 5—5 in FIG. 4.

FIG. 6 is a partial top view of the preferred embodiment.

DETAILED DESCRIPTION OF TEE PREFERRED EMBODIMENT

Figure 1:
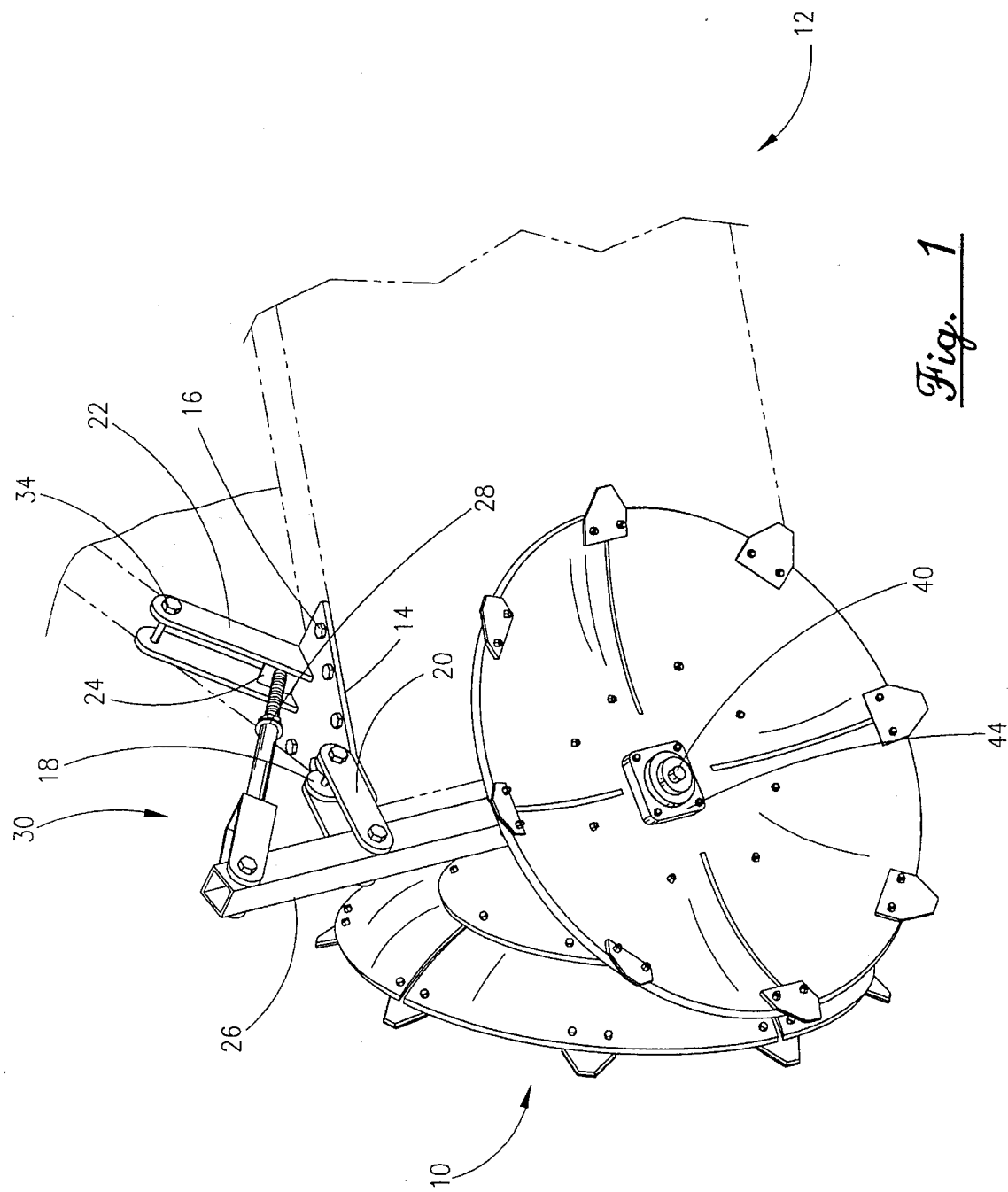
FIG. 1 is a perspective view of the preferred embodiment adapted to the bow of a boat.
Figure 2:
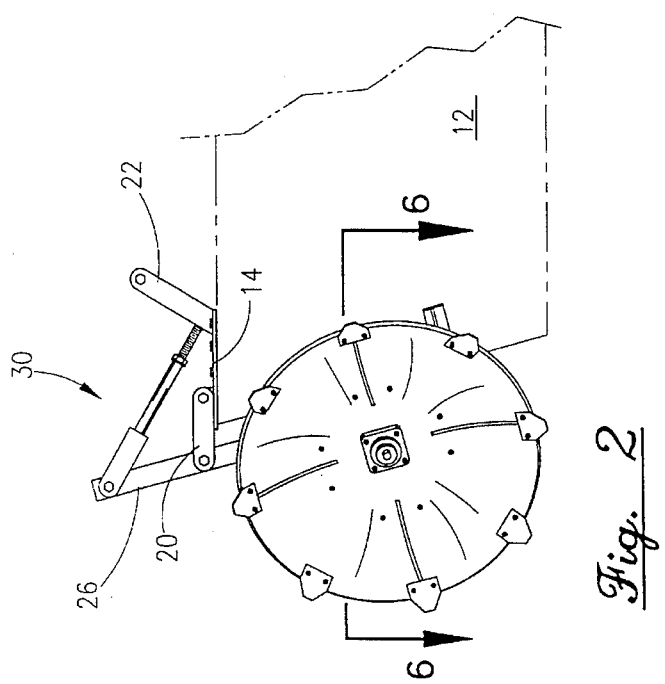
FIG. 2 is a side elevation of the preferred embodiment adapted to the bow of a boat shown in the working position.
Figure 4:
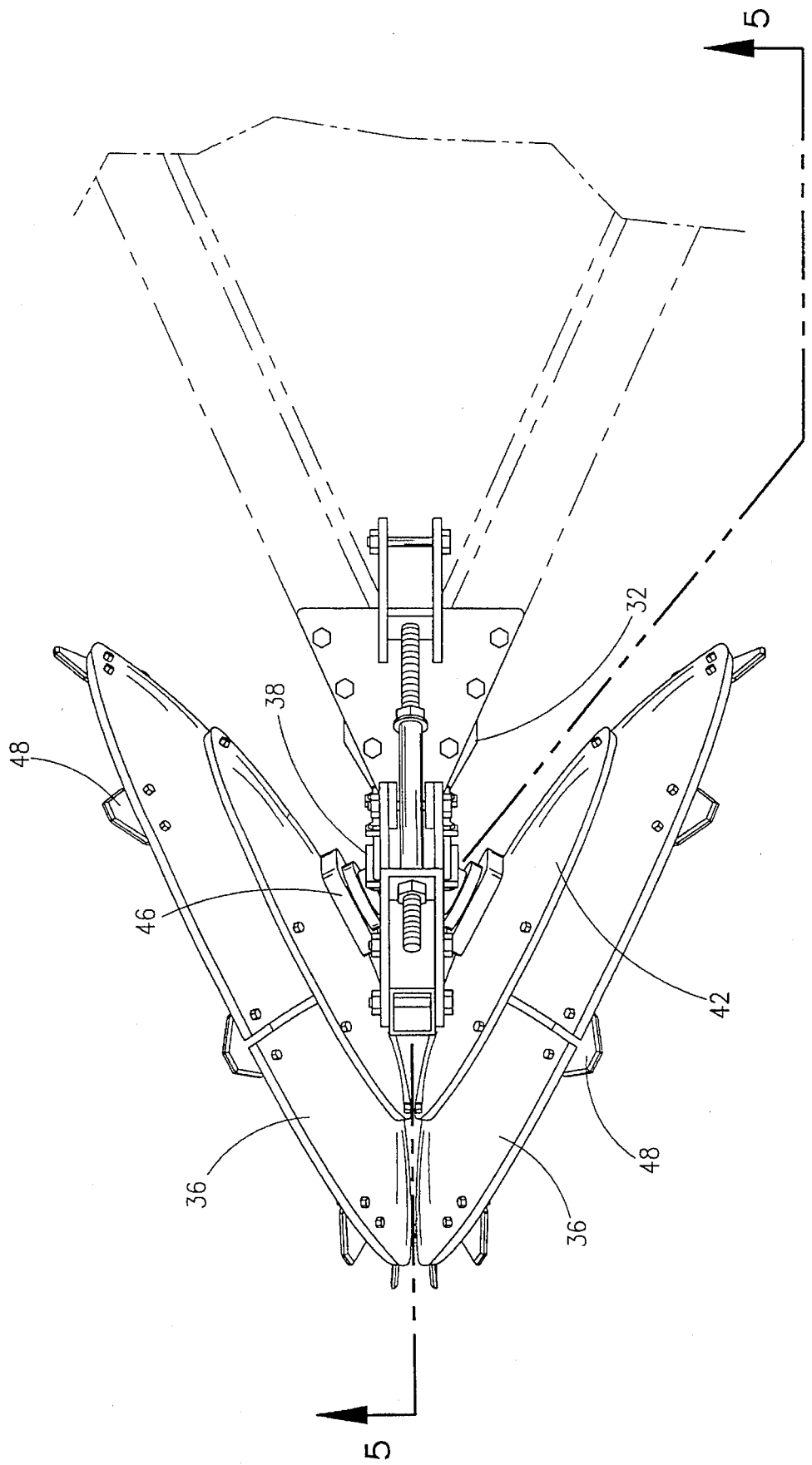
FIG. 4 is a top view of the preferred embodiment adapted to the bow of a boat with the disk in the working position.

The preferred embodiment of the aquatic vegetation cutting apparatus 10, as shown in FIG. 1 comprises a mounting bracket 14 having a set of bolts 16 for attachment to the bow of a fishing skiff or other similar work boat hulls 12. The mounting bracket 14 further comprises a forward clevis 18 for pivotally attaching a toggle link 20, and a rear clevis 22 which includes a brace docking plate 24. The toggle link 20 is also pivotally attached near one 20 end of a main support member 26. An adjustable brace assembly 30 is pivotally connected at one end to the upper end of the main support member 26. The opposite end of the adjustable brace 30 is positioned against the brace docking plate 24. Angular adjustment of the main support member 26 relative to a boat's bow angle is achieved by applying torque to[an adjusting nut 28 located on the brace assembly 30. A bifurcated member 32, attached near the lower end of the main support member 26, is provided to ensure central alignment and back-up support for the main support member 26 against the boat's hull. The adjustable brace assembly 30 forces the bifurcated member 32 against the boat's hull when in the working position as seen in FIG. 1 & 2.

Figure 3:
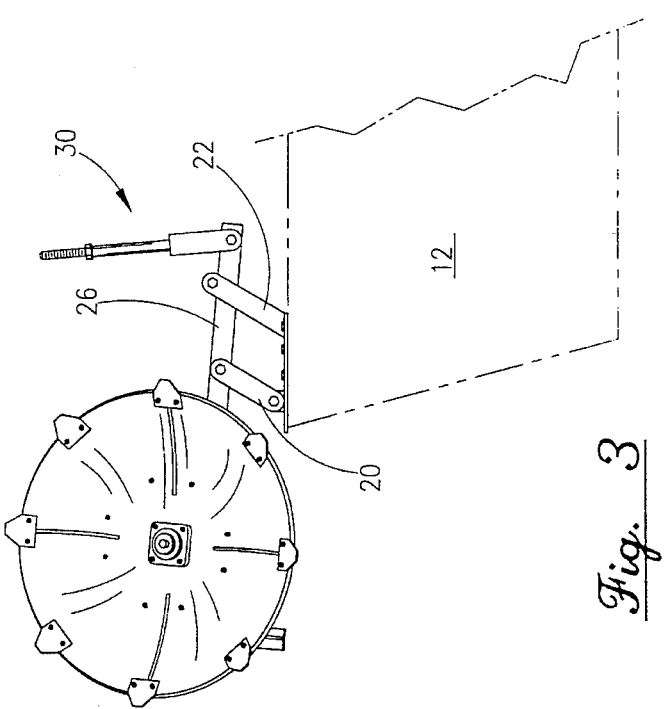
FIG. 3 is a side elevation of the preferred embodiment adapted to the bow of a boat shown in the tilted-up or non-working position.
Figure 10:
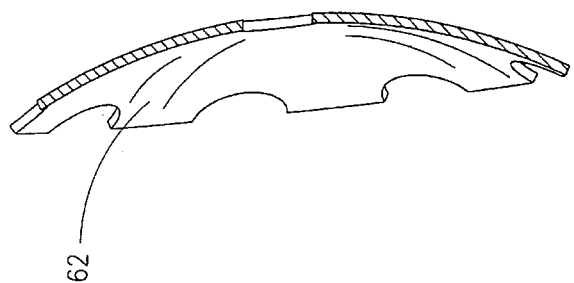
FIG. 10 is a cross section view of the alternative disk embodiment taken along sight line 10 in FIG. 9.
Figure 9:
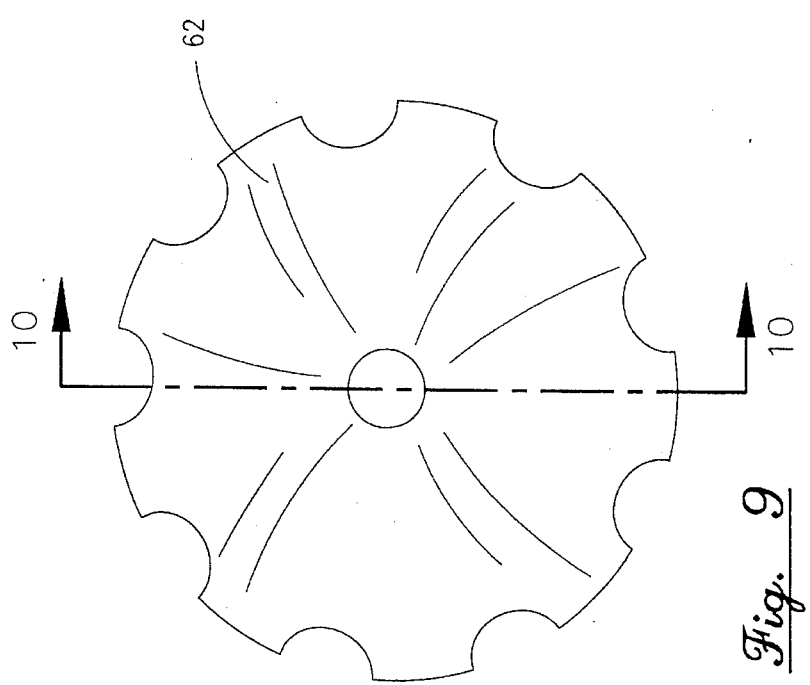
FIG. 9 is a vertical elevation of an alternative disk embodiment.

The main support member 26 can be pivotally rotated via the toggle link 20 in a manner which places the main support member 26 parallel to the mounting bracket 14 as best seen in FIG. 3. The main support member 26 is held in a balanced, locked-up position by a retaining pen or bolt 34 extending through the rear clevis 22. An arbor bracket 38 seen in FIG. 5 & 6 is adjustably attached to the main support member 26, thus allowing the cutting apparatus 10 to be positioned along the member relative to the boat hull 12. In the preferred embodiment, shown in FIG. 4, arbors 40 are attached to the arbor bracket 38 at angles which position cupped flanges 42 parallel with each side of the boat's bow 12. Bearings 44 and bearing flanges 46 mounted on the arbors 40, provide mounting and rotation capability for the cupped flanges 42. When the disk 36, usually cut from a flat pattern with slots to allow for compression, are attached to the cupped flanges 42, a dish shape is achieved and brings the disks 36 into contact with each other at their leading edge. Contact between the disks 36 insures rotation of both disk regardless of the amount of drag on each disk. The cupped shape also serves to move the cut vegetation away from the boat 12 as the boat passes. It should be noted that the disks 36 may be made from any suitable material and with a wide variety of cutting configurations, an example of which is shown in FIG. 9 & 10. However, it has been found that high density polymer material can be used for the disks 36 thus reducing the weight significantly and allowing the cutting apparatus 10 to be raised and lowered manually. If steel disks are used, a hydraulic lifting apparatus is usually employed. In some cases, as shown in FIGS. 1–4, a set of serrated blades 48 may be attached to the periphery of the disks 36. These blades provide the chopping action required in very dense vegetation. However, in other cases only minimum. cutting is required; therefore, a serrated disk such as that shown in FIG. 9 & 10, may be employed.

Figure 7:
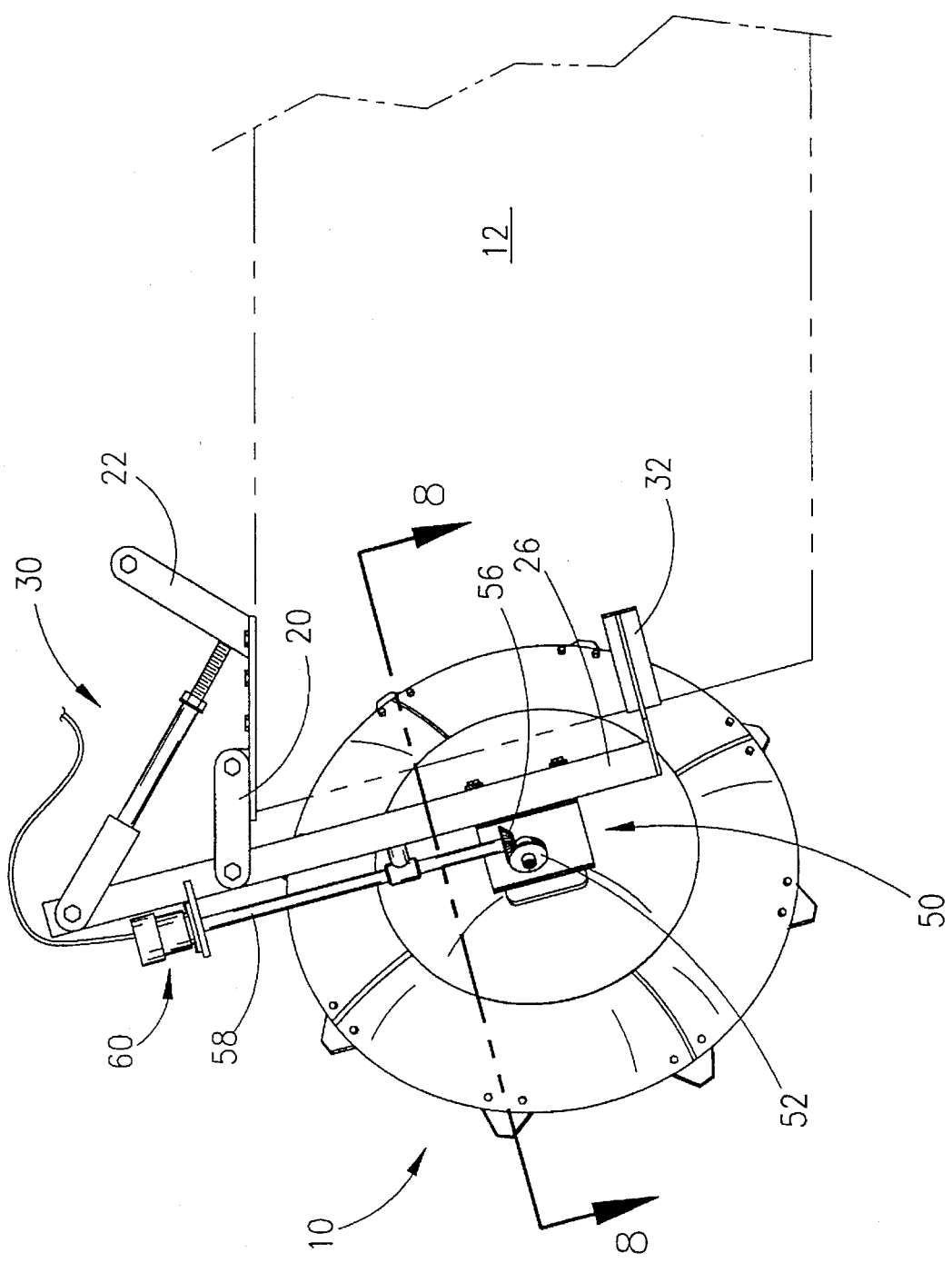
FIG. 7 is a cross section view ! of the driven embodiment taken along sight line 7—7 in FIG. 8.
Figure 8:
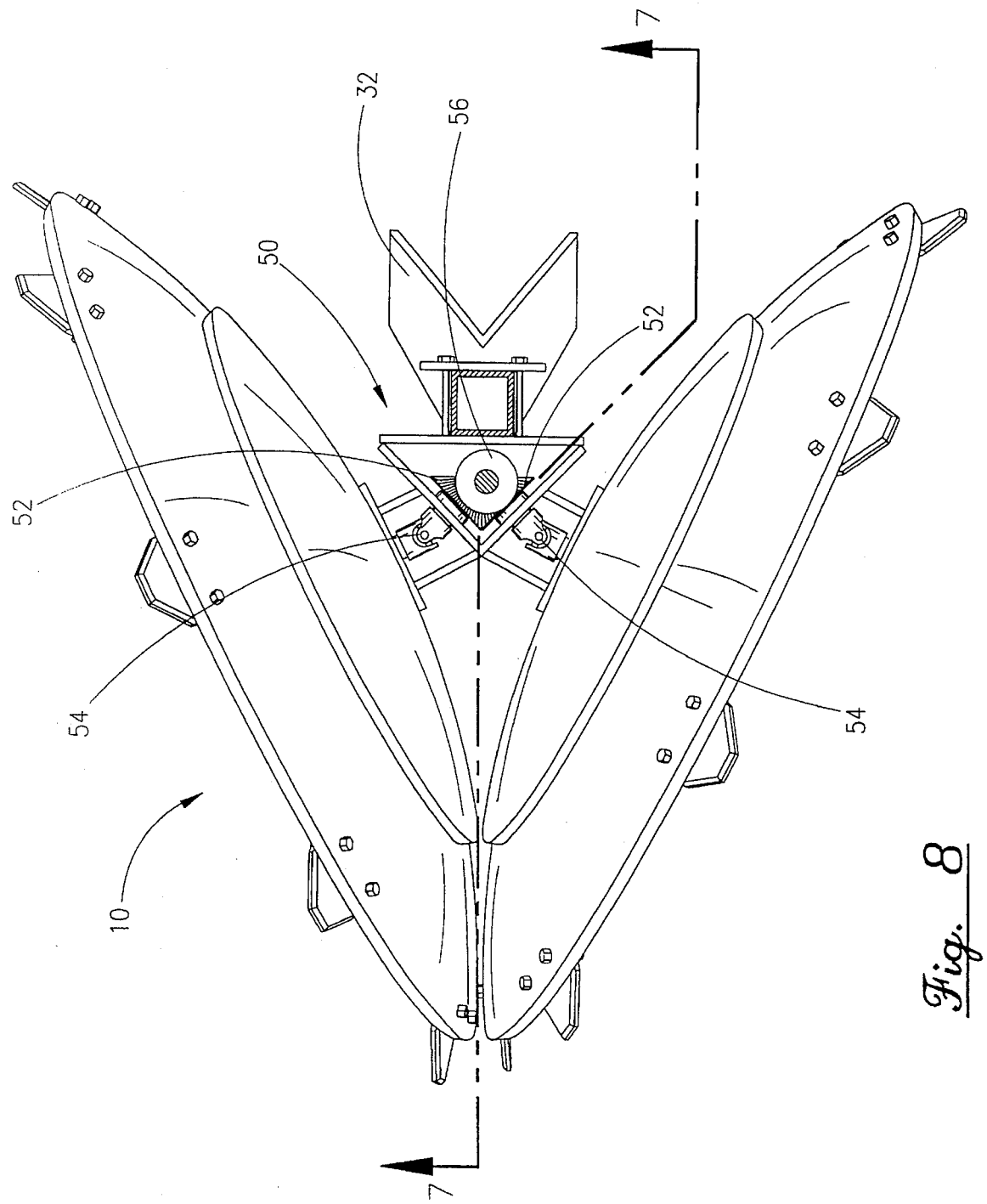
FIG. 8 is a cross section top view of the driven embodiment taken along sight line 8—8 in FIG. 7.

It is anticipated that multiple sets of disks may be employed on larger boats to clear canals and navigable streams. In which case it may be necessary to drive the cutting apparatus 10 rather than rely on frictional drag to turn it. An example of such drive means is shown in FIG. 7 & 8, wherein the cutting apparatus 10 is shown rotatably mounted to a bracket assembly 50 comprising pinion gears 52 and universal joints 54 as configured in FIG. 8. However, an enclosed gear box may be designed specifically for use in this application. The universal joints 54 allow the cutting apparatus 10 to be placed at angles less than the 45 degree pinion gears 52. The bracket assembly 50 is adjustably mounted to the main support member 26 in the same manner as the arbor bracket 38 shown in FIG. 5. The two pinion gears 52 are rotatably interfaced to provide positive drive torque to each of the cutting apparatus 10 via the U-joints 54. A drive pinion 56 is provided rotatably interfaced with one of the disk drive pinion gears 52 and is connected to a drive shaft 58, extending upwards, secured in a rotatable manner to the main support member 26. A drive motor 60 is also bracketed to the main support member 26 for connecting to the drive shaft 58. Any suitable drive means may be used for this purpose including but not limited to, hydraulic, air and electric.

Operation of the marine vegetation cutter apparatus 10 is achieved by pressing down on the main support member 26, as seen in FIG. 3; removing the retaining pin 34; lowering the support member 26 by thrusting the support member 26 forward thus allowing the toggle link 20 to pivot into a horizontal position, allowing the support member 26 to rotate into the vertical position, placing the free end of the adjustable brace assembly 30 against the rear clevis docking plate 24; and rotating the adjusting nut 28 until the bifurcated member 32 is securely braced against the boat's bow 12. Forward movement of the boat forces the disks 36 into contact with any marine vegetation thus causing the disks 36 to rotate. The disks' rotation cuts the vegetation, and separates it along each side of the boat. Adjustment of the disks 36 relative to the support member 26 should insure that approximately one third of the disks' diameter is below the water line.

Accordingly, this invention is limited only by the claims appended hereto, and their equivalent, when taken in combination with the complete description contained herein.

What is claimed is:

1. A cutting apparatus mounted to a boat's bow for severation of aquatic vegetation thereby opening a path for a boat to pass comprising:

a) cutting disks juxtaposed at oblique angles to each other;

b) an arbor means for allowing said disks to rotate freely;

c) a means for supporting and positioning said arbor; and d) a means for pivotally adapting said supporting and positioning means to a boat's bow.

2. A cutting apparatus according to claim 1 wherein said disks further comprise a plurality of triangular serrated teeth, spaced around their periphery.

3. A cutting apparatus according to claim 1 wherein said means for adapting said support to a boat's bow comprises:

a) a mounting bracket;

b) a toggle link pivotally attached to said mounting bracket;

c) a support member pivotally attached near one end to said toggle link;

d) a bifurcated member located near the other end of said support member;

e) a bearing and arbor means for rotatably attaching said disk;

e) a bracket means for slidably positioning and locking said bearing and arbor means relative to said support member; and f) an adjustable brace pivotally attached to the end of said support member adjacent said toggle link.

4. A cutting apparatus according to claim 3 wherein said mounting bracket further comprises:

a) a lock pin means for securing said support member in a horizontal position; and b) a docking means for anchoring said adjustable brace when said support member is in a substantially vertical position.

5. A cutting apparatus according to claim 4 wherein said disks are power driven.

6. An aquatic vegetation severator adaptable to a work boat comprising:
 a) at least two cultivator type disks, juxtaposed at oblique angles to each other;
 b) mounting means for adapting said cultivator type disks to a boat's bow; and
 c) arbor means for allowing said cultivator type disks to rotate freely about their central axis.

7. An aquatic vegetation severator according to claim 6 wherein said means for adapting said cultivator type disks to a boat further comprises:
 a) a mounting bracket, adaptable to specific boat hull configurations;
 b) a toggle link pivotally attached to said mounting bracket;
 c) a support member having a bifurcated member, configurable to specific boat hull configurations, pivotally attached near one end to said toggle link;
 d) an arbor means for rotatably attaching said cultivator type disk;
 e) a bracket means for slidable positioning and locking said arbor means relative to said support member; and
 f) an adjustable brace pivotally attached to said support member adjacent said toggle link.

8. An aquatic vegetation separator according to claim 7 wherein said mounting bracket further comprises:
 a) a lock pin means for securing said support member in a horizontal position; and
 b) a docking means for anchoring said adjustable brace when said support member is in a substantially vertical braced position.

9. An aquatic vegetation separator according to claim 6 wherein said cultivator type disks are power driven.

10. A method of cutting and separating aquatic vegetation to allow unobstructed passage of a marine vessel comprising the steps of:
 a) mounting a set of rotatable, disks juxtaposed at oblique angles to each other to a marine vessel's bow;
 b) lowering said disks to a point partially below said marine vessel's water line; and
 c) propelling said vessel through aquatic vegetation, cutting and parting said vegetation to each side as said marine vessel passes.

11. A method of clearing a passage through floating aquatic plants comprising the steps of:
 a) attaching a set of rotatable disks juxtaposed at oblique angles to each other to a boat's bow in a manner whereby a portion of said disks are below the water line of said boat when in a working position;
 b) rotatably driving said disk; and
 c) propelling said boat and said rotating disks through said aquatic plants.

* * * * *